March 12, 1929.  F. P. SNOW  1,704,955
VALVE FACING
Filed Jan. 13, 1927
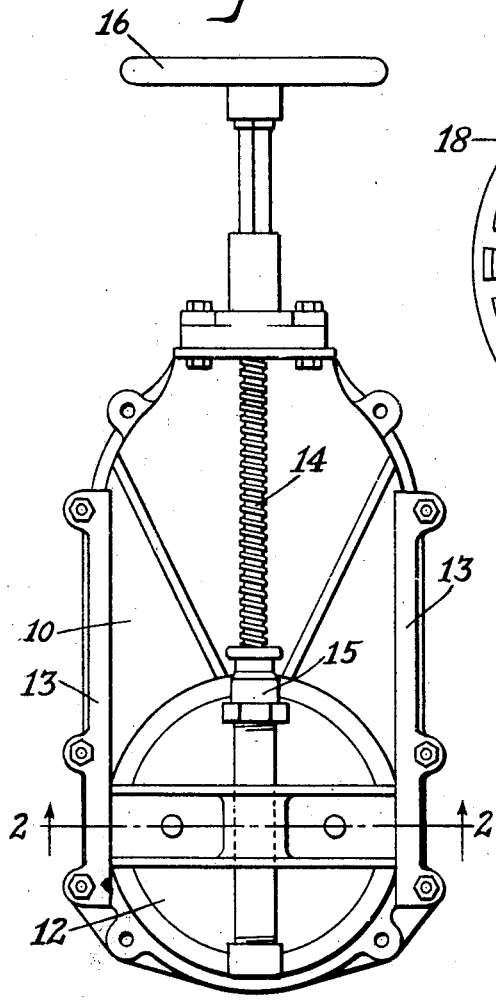
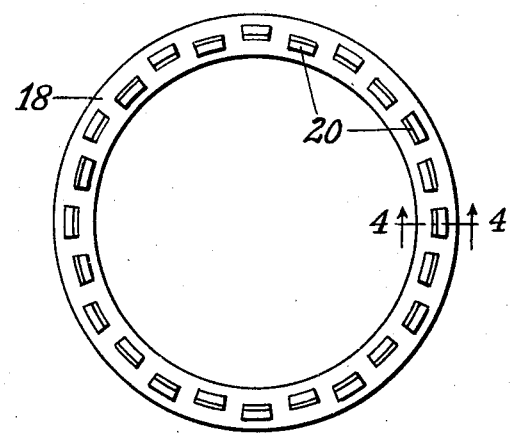
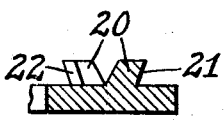
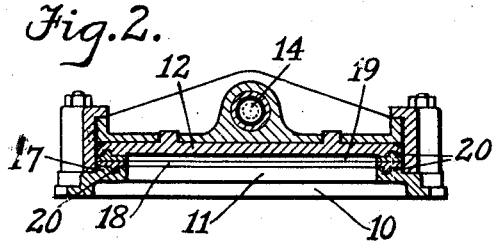
INVENTOR,
Frank P. Snow
BY
ATTORNEY.

Patented Mar. 12, 1929.

1,704,955

UNITED STATES PATENT OFFICE.

FRANK P. SNOW, OF LOS ANGELES, CALIFORNIA, ASSIGNOR TO SNOW MANUFACTURING COMPANY, INC., OF LOS ANGELES, CALIFORNIA.

VALVE FACING.

Application filed January 13, 1927. Serial No. 160,897.

My invention relates to water gates and more particularly to a non-corrodible facing for valves and valve seats of water gates, such as are used in irrigating systems.

As is well known, the gates generally used in irrigating systems are made of cast iron which soon rusts and corrodes sufficiently to cause leaks between the valve and its seat, however perfectly they may have been finished and fitted originally. Such tendency of the valve may be overcome in a large measure, if not entirely, by facing them with a relatively non-corrodible metal such as brass or bronze.

The primary object of my invention is to provide an improved non-corrodible facing for valves and valve seats which may be secured thereto so as to insure water gates in which they are used against leakage.

Other objects and advantages will appear hereinafter, and while I show herewith and will describe a preferred form of construction, I desire it to be understood that I do not limit my invention to such preferred form, but that various changes and adaptations may be made therein without departing from the spirit of my invention as hereinafter claimed.

Referring to the drawings which accompany this specification and form a part thereof.

Fig. 1 is a view in elevation of a simple form of water gate, the valve and valve seat of which are equipped with my non-corrodible facing.

Fig. 2 is a transverse sectional view of the gate shown in Fig. 1, taken on line 2—2 of that figure.

Fig. 3 is a plan view of one of the facing rings used on a gate of the type shown in Figs. 1 and 2.

Fig. 4 is an enlarged sectional view of the ring shown in Fig. 3, the section being taken on line 4—4 of that figure.

The gate shown in Figs. 1 and 2, for the purpose of illustration only, consists of a cast body-piece 10 with an opening 11 in its lower end and a plate or valve 12 adapted to slide over the opening in guides 13, and a screw-threaded stem 14 working in a nut 15 attached to valve 12, said stem being equipped with a hand-wheel 16 on its upper end by which it may be turned to raise or lower the valve and thus open or close the gate.

The valve seat 17 is faced with a flat brass or bronze ring 18, of the type shown in Fig. 3, and the valve 12 is faced with a similar ring 19 so that when the gate is closed the two rings 18 and 19 coincide and their entire flat faces are in close contact. No leakage is therefore possible between the two rings and the gate is maintained in a water tight condition so long as they remain intact.

I provide flat brass or bronze facing rings, one side of which is equipped with flanges or studs made integral with the rings, to anchor them in the gate castings of which they are to form a part, which are included in the usual way and prepared beforehand. Figs. 3 and 4 show a ring with a double series of spaced flange sections 20, the outer series of which are undercut on their outer sides, as at 21, and the inner series of which are undercut on their inner sides as at 22, to provide a sort of dove-tail anchorage. The flanges 20 in the outer row have undercut outer faces while those of the inner row have undercut inner faces, that is to say, are undercut at the side nearest the center of the ring. This feature, in conjunction with the fact that the flanges in the outer row are staggered with relation to those in the inner row, provide a wider distribution over the face of the ring of the anchoring means which aids in holding the ring firmly down both near its inner edge and near its outer edge.

The ring, made in any one of these several forms or with modified anchorage, is used with a pattern of the part to be cast, which pattern is prepared so that it and the ring together form a complete pattern of that part of the gate. The mold is prepared in the usual way except that only that part of the pattern which is used with the ring is withdrawn from the mold, the ring itself being left in the mold to form a part of the casting. The molten iron is poured in the usual way, the only necessary precaution being that its temperature must not be so high as to melt the ring around which it flows as the mold is filled. After having cooled, the casting is removed and finished in the usual way, the result being a solid casting with a non-corrodible seating face.

While I have shown a simple form of gate by way of illustration, it is evident that any other type of water gate including wedge-valve gates may be similarly equipped with similar or modified forms of non-corrodible facings.

Having thus illustrated and described my invention, I claim.

1. As a new article of manufacture, a valve facing consisting of an annular metallic ring having ranged along one face thereof two rows of upstanding flanges one of said rows being radially beyond the other row, the flanges of the outer row having undercut outer faces, and the flanges of the inner row having undercut inner faces.

2. As a new article of manufacture, a valve facing consisting of an annular metallic ring having ranged along one face thereof two rows of upstanding flanges one of said rows being radially beyond the other row, the flanges of the outer row having undercut outer faces, and the flanges of the inner row having undercut inner faces, the flanges of one of said rows being staggered in relation to those of the other row.

FRANK P. SNOW.